C. S. EWRY.
EGG TRAY.
APPLICATION FILED AUG. 27, 1919.

1,345,483.

Patented July 6, 1920.

Witness:
Adelaide Kearns.

Inventor:
Charles S Ewry;
By Robert W. Vandle,
Attorney.

UNITED STATES PATENT OFFICE.

CHARLES S. EWRY, OF PORTLAND, INDIANA.

EGG-TRAY.

1,345,483.

Specification of Letters Patent.

Patented July 6, 1920.

Application filed August 27, 1919. Serial No. 320,095.

*To all whom it may concern:*

Be it known that I, CHARLES S. EWRY, a citizen of the United States, residing in the city of Portland, in the county of Jay, State of Indiana, have invented new and useful Egg-Trays, of which the following is a full, clear, and comprehensive specification and exposition, the same being such as will enable others to make and use the same with exactitude.

The object of my present invention, broadly speaking, is to provide egg-trays, for incubators, with means whereby all of the eggs carried by a tray may be turned almost instantly and by a single movement of the operator, and without removing the tray from the incubator, and without removing the eggs from the tray, and also providing means whereby the eggs can roll only about their longitudinal axes. Therefore to overcome the above mentioned objections, and others not enumerated, is the particular object of this invention.

Figure 1:
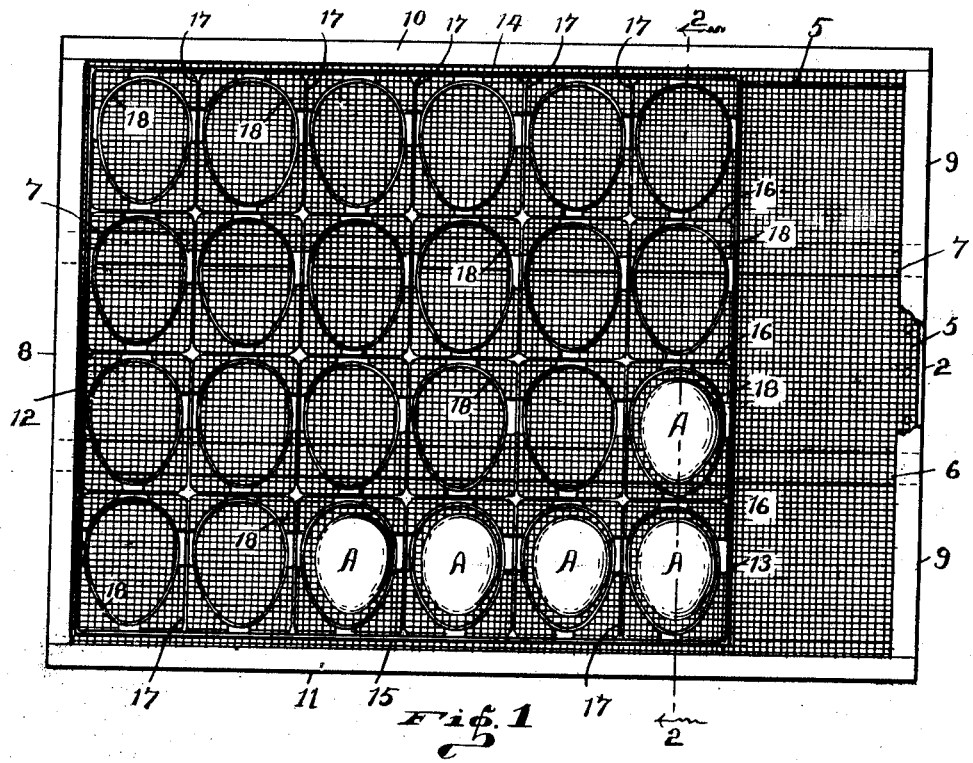
Figure 2:
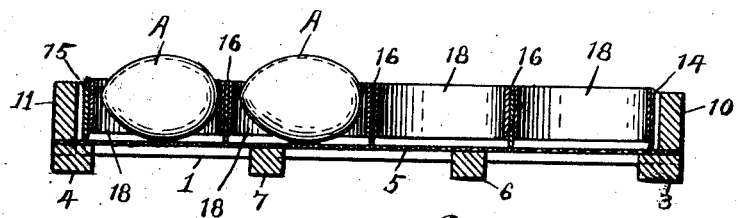
Figure 3:
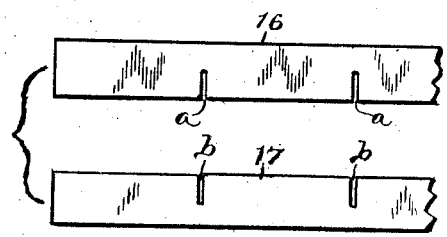

The preferred means for carrying out the objects of my invention in a practical and efficient manner is shown in the accompanying drawings, in which—Figure 1 is a plan view of my egg-tray as it would appear in practice. Fig. 2 is a cross section, as taken on the line 2—2 of Fig. 1. And Fig. 3 is a detail view showing the manner of forming the partitions for the inner tray.

Similar indices denote like parts throughout the several views.

In order to make clear the construction, the operation, and the advantages of my invention, I will now take up a detailed description thereof, in which I will set forth the same as fully and as comprehensively as I may.

In the drawings it will be seen that the body or main tray portion comprises the end members 1 and 2, and the side members 3 and 4, thereby forming an open frame which may be of any suitable dimensions. Secured on the surfaces of the members 1, 2, 3 and 4 is a screen wire 5 which forms the bottom of the main tray. Numerals 6 and 7 denote slats which connect the members 1 and 2 and provide supports for the central portion of the screen bottom 5. Covering the edges of the screen 5 and secured to the upper edges of the respective members 1, 2, 3 and 4 are the guards 8, 9, 10 and 11, thereby completing the main tray or body of the device. The tray formed as described is adapted to slide in and out of an incubator, being supported therein by cleats on which the side members 3 and 4 may slide.

The shiftable or inner tray is composed entirely of sheet metal and it comprises the end members 12 and 13, and the side members 14 and 15, all of which are connected together at their ends.

Dividing the frame of the inner tray longitudinally are a plurality of partitions 16, which are parallel with each other and with the members 14 and 15 and they, together with the members 14 and 15 are spaced an equal distance apart. Likewise dividing the inner tray, at right angles to the members 16, are the cross partitions 17, which are arranged parallel with each other and with the members 12 and 13 and they, together with the members 12 and 13 are spaced an equal distance apart. At each intersection of a member 16 with a member 17 a notch is formed therein, as the respective notches *a* and *b* shown in Fig. 3. The notches *a*, for instance, are cut from the lower edge upward half through the member 16. And the notches *b*, for instance, are cut from the upper edge downward half way through the member 17. Now if the members 16 and 17 be turned at right angles to each other it is apparent that the members 16 and 17 may be locked together and located on the same plane with each other, and thereby dividing the inner tray into a plurality of oblong or square spaces, as indicated.

The ends of the members 16 and 17 are soldered or otherwise secured to the inner faces of the members 12—13 and 14—15, and also each intersection of a member 16 with a member 17 is soldered or otherwise secured, to form a rigid framework of the whole.

In each of the square or oblong spaces formed by the members 16 and 17, and also in some places by the members 12, 13, 14 and 15, there is secured an oval lining 18, and the periphery of each oval lining 18 touches at four points: two of the members 16 and two of the members 17, or as in the outer spaces, one or two of the members 12, 13, 14 and 15, as indicated in Fig. 1. At each contact point of each of the oval linings 18 with a member 16, 17, 12, 13, 14 and 15, the same is rigidly secured by soldering or otherwise.

The interior of each oval lining 18 should correspond with the shape of an egg and should be of a size slightly larger than an egg to be placed therein, in order that the egg may lie loosely therein and roll on the bottom 5 of the main tray.

The inner tray is adapted to rest on the screen or bottom 5, with the sides 14 and 15 near but not in contact with the members 10 and 11. The length of the inner tray is considerably less than is the length of the main tray, being a certain definite proportion, for the reason hereinafter made clear.

In actual practice it is supposed that each of the oval linings 18 will contain an egg A, and also that the trays may be of any desired size to contain any number of eggs.

Suppose, now, that the device be arranged as in Fig. 1, with the eggs A in position, with all or a part of the oval linings filled with eggs:

Desiring now to give the eggs a half-turn one has only to slide the inner tray to the right (Fig. 1) until the member 13 contacts with the member 9 when it will be found that all of the eggs have been given a half turn, as the difference in the length of the trays is such as to accomplish this accurately. Then when it is desired to again turn the eggs the attendant has only to slide the inner tray until the member 12 contacts with the member 8, which manifestly will turn the eggs back to the position in which they are shown.

By the above it is apparent that one may turn all of the eggs in a tray as quickly as one egg could be ordinarily turned, and besides the work will be done without danger of breaking the eggs, and without touching the eggs with one's hands.

In practice a plurality of trays, such as described, are placed one above the other in an incubator, forming a section, and therefore the eggs in all of the trays of such a section can be turned at one time if desired, and that almost instantly, and without removing the trays from the incubator.

I desire that it be understood that various changes and variations may be made in the construction from that herein shown and described, without departing from the spirit of my invention, and without sacrificing any of the advantages thereof.

Having now fully shown and described my invention, what I claim and desire to secure by Letters Patent of the United States, is—

1. An egg tray comprising in combination, a main frame, a screen bottom for said frame, a guard extending up from the main frame, an inner frame slidable only forward and backward in the main frame and resting on said screen bottom, partitions dividing the space in the inner frame into a plurality of individual egg compartments, an oval lining secured in each of said compartments and conforming to the shape of an egg and adapted to extend entirely around an egg and of a size only slightly greater than the egg to be located therein, the eggs located in their respective oval linings being supported on said screen bottom, and the limit of movement of the inner frame being such as to give the eggs located therein a half turn when the inner frame is moved to its limit either forward or backward, all substantially as shown and described.

2. An egg tray comprising a main frame, a screen bottom for the main frame, means for supporting the central portion of the bottom, a guard extending up from each side of the main frame, an inner frame resting loosely on the screen bottom and slidable between two members of the guards and adapted to slide toward and from the other two members of the guards with movements limited so as to cause eggs to be turned only one-half over at each forward or backward movement of the inner frame, sheet metal partitions dividing the inner frame into substantially square compartments, a sheet metal lining secured in each compartment and each conforming with the shape of an egg around the longitudinal diameter thereof, all substantially as shown and described.

In testimony whereof I have hereunto subscribed my name to this specification in the presence of two subscribing witnesses.

CHARLES S. EWRY.

Witnesses:
 FRED H. EWRY,
 ROBT. W. RANDLE.